(12) United States Patent
Touboul et al.

(10) Patent No.: US 8,160,491 B2
(45) Date of Patent: Apr. 17, 2012

(54) GPS SYNCHRONIZATION METHOD FOR MOBILE WIRELESS NETWORKS

(75) Inventors: Assaf Touboul, Natanya (IL); Oz Barak, Hod Hasharon (IL)

(73) Assignee: Designart Networks Ltd, Ra'anana, IL (US)

( * ) Notice: Subject to any disclaimer, the term of this patent is extended or adjusted under 35 U.S.C. 154(b) by 238 days.

(21) Appl. No.: 12/637,777

(22) Filed: Dec. 15, 2009

(65) Prior Publication Data

US 2010/0087206 A1 Apr. 8, 2010

Related U.S. Application Data

(63) Continuation-in-part of application No. 12/269,904, filed on Nov. 13, 2008.

(60) Provisional application No. 61/085,013, filed on Jul. 31, 2008.

(51) Int. Cl.
*H04B 7/19* (2006.01)
(52) U.S. Cl. ....... 455/13.2; 455/205; 455/265; 455/502; 370/252; 370/254; 370/312; 370/328; 370/338
(58) Field of Classification Search ................ 455/41.2, 455/404.2, 425, 436, 450, 439, 448, 456.6, 455/456.5, 502; 370/203, 252, 254, 312, 370/315, 328–329
See application file for complete search history.

(56) References Cited

U.S. PATENT DOCUMENTS

2003/0072397 A1* 4/2003 Kim et al. .................... 375/347
2005/0002323 A1* 1/2005 Hadad .......................... 370/203
2008/0019350 A1 1/2008 Onggosanusi
2008/0085720 A1* 4/2008 Hirano et al. ............... 455/452.1
2008/0095121 A1* 4/2008 Shattil ........................... 370/335
2008/0153497 A1* 6/2008 Kalhan ......................... 455/436
2008/0232487 A1* 9/2008 Cleveland et al. ............ 375/260
2008/0244148 A1* 10/2008 Nix et al. ...................... 710/313
2009/0061821 A1* 3/2009 Chen et al. ................... 455/411
2010/0016022 A1* 1/2010 Liu et al. ...................... 455/561
2011/0103406 A1* 5/2011 Cai et al. ...................... 370/480
2011/0134889 A1* 6/2011 Harvey et al. ................ 370/335

FOREIGN PATENT DOCUMENTS

DE 10032934 A1 1/2002
WO 2008025978 A1 3/2008
WO 2009049207 A2 4/2009

OTHER PUBLICATIONS

Sean Ginevan "Femtocells: Is There Room for Them on Your Network?" Internet Citation, Jul. 27, 2007, pp. 1-2, XP002510044, Retrieved from the internet : URL:http;//www.networkcomputing.com/article/printFullArticleSrc.jhtml?articleID=201201521 (Retrieved on Jan. 13, 2009).

* cited by examiner

*Primary Examiner* — Pierre-Louis Desir
*Assistant Examiner* — Indir Mehra
(74) *Attorney, Agent, or Firm* — Deborah Gador

(57) ABSTRACT

A method and system for GPS (Geographical Positioning System) synchronization of a femtocell, as defined in the application, in a wireless telecommunications network, the system including a Base Transceiver Station (a "sync-BTS") for transmitting synchronization signals, a module for GPS synchronization coupled to the sync-BTS, at least one femtocell, and a processor in each femtocell for performing time and frequency synchronization on the sync-BTS over an air interface.

15 Claims, 4 Drawing Sheets

GPS SYNCHRONIZATION METHOD FOR MOBILE WIRELESS NETWORKS

RELATED APPLICATIONS

This application claims the benefit of U.S. provisional application Ser. No. 61/085,013 filed 31 Jul. 2008 and U.S. patent application Ser. No. 12/269,904 filed 13 Nov. 2008.

FIELD OF THE INVENTION

The present invention relates to wireless communications networks, in general and, in particular, to GPS synchronization in WiMAX®, LTE® and other 4G wireless communications networks.

BACKGROUND OF THE INVENTION

Broadband wireless is expected to be one of the main drivers of the telecommunications industry. There is a substantial increase in demand for broadband wireless connectivity, with wireless broadband being the key growth engine for mobile wireless broadband networks.

The traditional approach for mobile network infrastructure deployment is similar to that of cellular phone networks. The network is based on macro-cell deployment, that is, the base stations, radios and antennas are installed on top of high towers, transmitting at high power, so as to maximize the base station coverage area. However, as smaller and smaller cells are utilized, the increasing numbers of base stations, particularly femtocells, in a geographical area create a major problem of interference management, due to interference between base stations.

In conventional wireless telecommunications networks, mobile stations must synchronize to a nearby base station. In addition, in order for the mobile wireless network to operate properly, synchronization is required between the different base stations. The quality of the synchronization in the network directly impacts the interference generated by the network. The transmission of voice, video and data through any communication network requires a stable frequency reference, and precise frequency synchronization is especially critical in mobile networks for successful call signal hand-off between base stations, as well as for the transport of real-time services.

Femto- and pico-cells can be connected to a conventional wired backhaul which is IP-based, for example, DSL (XDSL) or other Ethernet-based wire line communication techniques. One technique for providing synchronization to the base station connected to this type of backhaul is defined in IEEE Standard 1588, which can provide 1-PPS synchronization over Ethernet. However, IEEE 1588 is limited in time jitter performance, which may violate regulation requirements.

As more networks transition to an IP-centric backhaul, the changes in the backhaul also impact how the network derives an accurate sync feed. In addition, as the size of cells diminishes from macro to micro to pico to femtocells, the need for, and the difficulty of providing, accurate synchronization increase dramatically. For example, GSM network (Global System for Mobile communications) base stations have traditionally derived their long-term frequency accuracy from locking a relatively low-performance quartz oscillator embedded in the base station to a recovered clock signal from a T1/E1 leased line backhaul facility. Timing signals based on a primary reference source (PRS) transmitted over the backhaul keep the embedded oscillator calibrated to within sufficient accuracy. Without a well-synchronized backhaul feed to lock to, the oscillator frequency would drift out of specification in a matter of months or days. Thus, a reliable and accurate time source is required for accurate synchronization.

One solution to this problem is achieved by installing an external GPS receiver and antenna in each base station to provide the external 1-PPS signal to the base station equipment. From this signal, the base station derives and locks the start of the frame and the frequency synchronization. It will be appreciated that GPS satellites transmit the clock time to each base station in the network at the same time.

In indoor network applications, there is great technical difficulty in providing GPS synchronization for each and every base station, because of the low amplitude and wall penetration losses of the GPS transmission, making GPS reception indoors, especially on lower levels, almost impossible. Thus, conventional femtocells cannot be synchronized by GPS, since there is insufficient indoor coverage by the GPS network.

Even if there were GPS coverage, the GPS module cost is too high for use in femtocell home base station applications. Deployment of a GPS antenna for every base station in a micro-/pico-/femtocell deployment would be very expensive, due to equipment and GPS service provider costs.

Accordingly, there is a long felt need for a relatively low cost method of providing accurate and robust synchronization in femtocells in both outdoor and indoor locations.

SUMMARY OF THE INVENTION

The present invention provides a unique and low-cost solution for robust GPS-based synchronization for femtocells and other base stations in a wireless communication network, which includes providing clock time synchronization and radio resource management. For purposes of this application, the term "femtocell" will be used to denote any type of base station or relay station of any size, whether macro-, micro-, pico- or femtocell, disposed indoors or out of doors, for use in WiMAX, LTE and other $4^{th}$ generation broadband wireless communication networks.

There is provided according to the present invention a method for GPS synchronization of a femtocell, as defined in the application, in a wireless telecommunications network, the method including coupling a module for GPS synchronization to a Base Transceiver Station (a "sync-BTS") arranged for transmitting synchronization signals, transmitting synchronization signals from the sync-BTS, and performing synchronization on the sync-BTS over an air interface by at at least one femtocell.

According to one embodiment of the invention, time and frequency synchronization of the femtocell in a wireless telecommunications network are provided by transmitting pilot tones from the "sync-BTS", performing, in the femtocells, preamble synchronization with the sync-BTS for initial acquisition; and decoding the pilot tones to identify and correct timing and frequency offset in the femtocells for tracking.

There is also provided, according to the present invention, a method and system for GPS (Geographical Positioning System) synchronization of a femtocell, as defined in the application, in a wireless telecommunications network, the system including a Base Transceiver Station (a "sync-BTS") for transmitting synchronization signals, a module for GPS synchronization coupled to the sync-BTS, at least one femtocell, and a processor in each femtocell for performing time and frequency synchronization on the sync-BTS over an air interface.

According to one embodiment of the invention the system provides time and frequency synchronization of a femtocell in a wireless telecommunications network, the "sync-BTS" further includes a transmitter for transmitting pilot tones; a plurality of femtocells coupled for communication to the sync-BTS, each femtocell including a processor for preamble synchronization with the sync-BTS for initial acquisition; and a decoder in each femtocell for decoding the pilot tones to identify and correct timing and frequency offset in the femtocells.

The sync-BTS can be integrated in a base station, or in a feeder in a mesh network described in the patent publication cited above.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a method for GPS-based synchronization of femtocells in a 4G wireless mobile communication network (e.g., WiMAX, LTE). Due to the fact that an on-board GPS module is not a valid solution for indoor located, low-cost femtocells, the proposed solution is based on a low cost, outdoor Base Transceiver Station (BTS) unit (referred to herein as a "sync-BTS"), which incorporates a module for GPS synchronization, and transmits a preamble and pilot signals to synchronize all the femtocells in its surrounding area. This is desired so that all units begin transmission or reception at the same time over the same frequency bandwidth, so as to reduce interference. Each sync-BTS is tuned to a femtocell network channel and is designed to serve as a pure synchronizer for the femtocells transceiving on that channel. It will be appreciated that one sync-BTS must be provided for each femtocell network channel.

The sync-BTS can be collocated to an external, outdoor macro BTS or integrated within it. Furthermore, the sync-BTS can work on the same frequency as the macro BTS, or on a different frequency for the femto-network. It will be appreciated that the sync-BTS is a dedicated base station unit for transmitting synchronization signals, and may or may not include reception capabilities.

Figure 1:
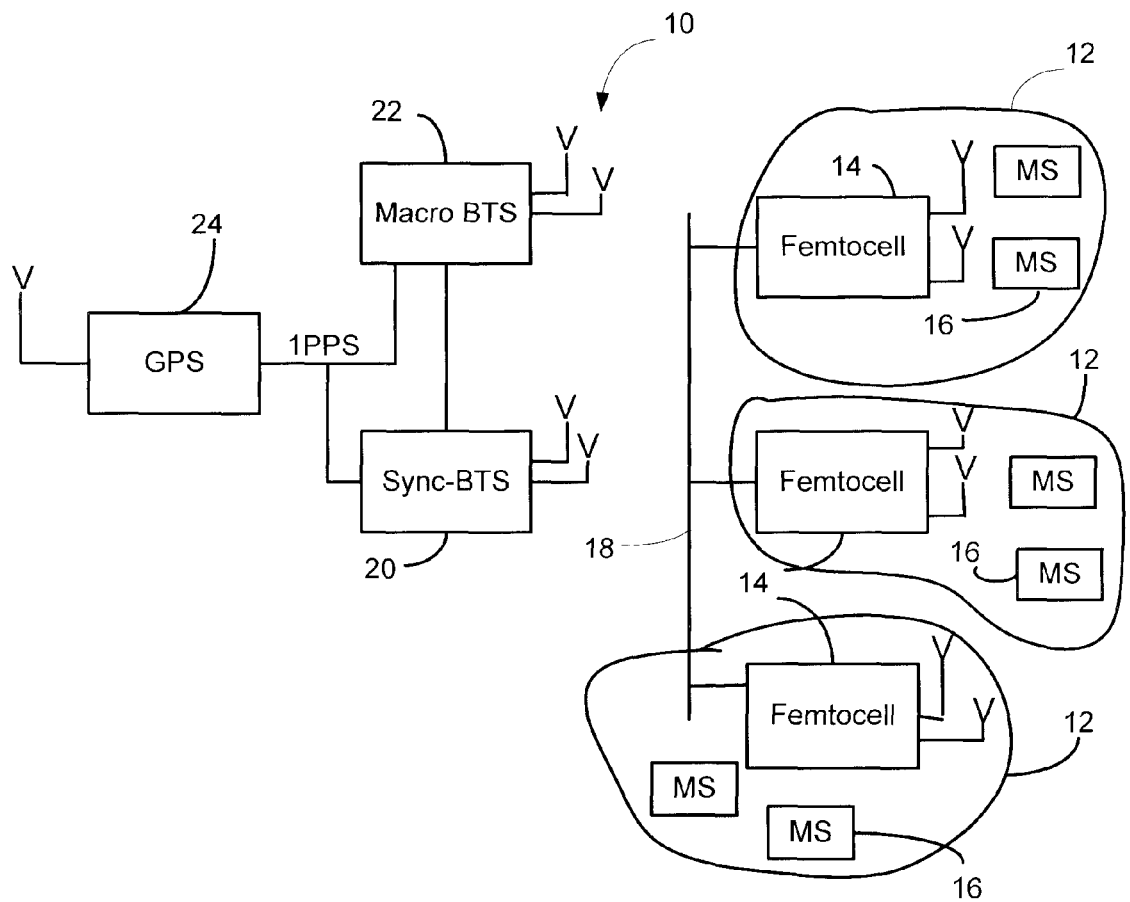
FIG. 1 is a schematic illustration of a femtocell network constructed and operative in accordance with one embodiment of the present invention.

Referring now to FIG. 1, there is shown a schematic illustration of a femtocell network 10 constructed and operative in accordance with one embodiment of the present invention. Network 10 includes a plurality of Radio Access Networks (RAN) 12. Each RAN 12 includes a femtocell 14 and one or more mobile stations (subscribers) 16. Each femtocell 14 is coupled to a core network (not shown) via wired backhaul 18, e.g., XDSL or Ethernet.

According to the present invention, a robust synchronization solution is provided. An outdoor base station, sync-BTS 20 is provided for each femtocell network channel, for transmitting synchronization signals. (For ease of illustration, only one is shown.) Sync-BTS 20 is illustrated here as being mounted adjacent to a conventional macro base station 22. A module for GPS synchronization 24, including a receiver and antenna, is coupled to sync-BTS 20 and macro base station 22, as via a 1PPS cable, and provides a 1-PPS signal for synchronization. Each of the femtocells synchronizes on the transmitted signal from the sync-BTS over an air interface, as described in detail below.

Figure 2:
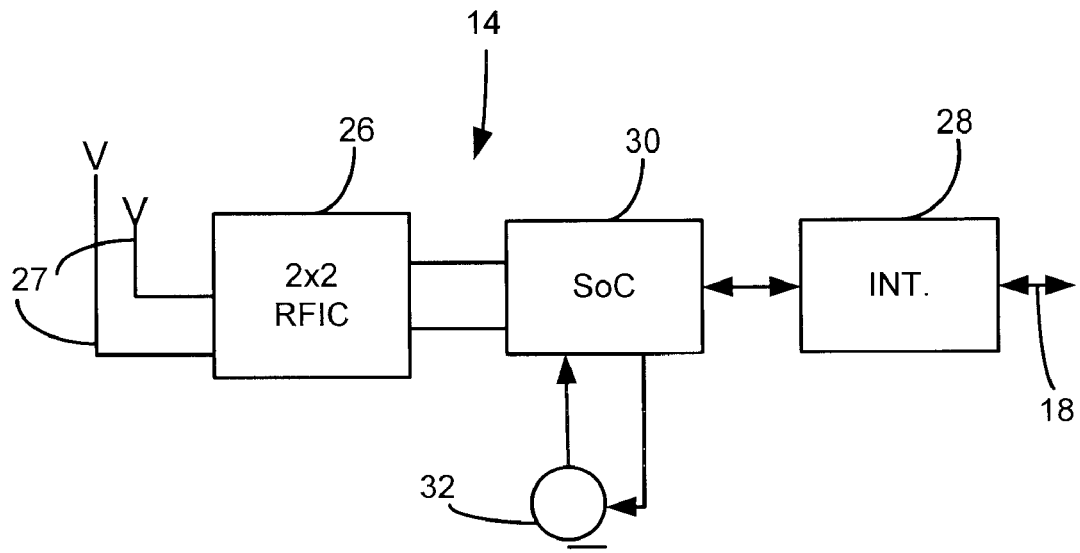
FIG. 2 is a block diagram illustration of a femtocell, according to one embodiment of the invention.
Figure 4:
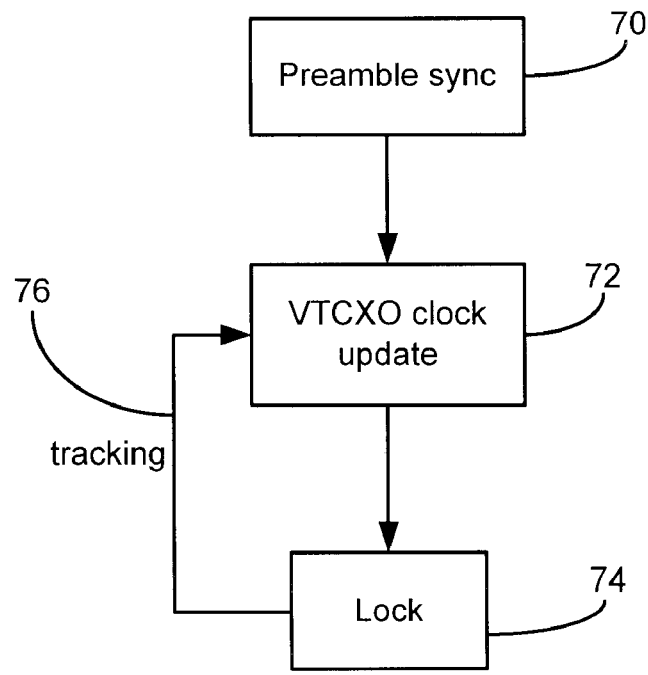
FIG. 4 is a block diagram illustration of a method of over the air synchronization, according to one embodiment of the invention.

Preferably, each femtocell 14 includes a transceiver 27 with one or more antennas 27 for transmission and for reception, as shown, by way of example only, in FIG. 2, and is coupled via cable interface hardware 28, such as Ethernet or DSL, to the wired backhaul 18. The femtocell baseband, modem, MAC, network processor and software of the present invention are preferably implemented as a hardware platform using an SoC (System on Chip) 30 that should be capable of running all base station functionality, both hardware and software. In addition, it should incorporate, in one example, integrated hardware and software modules (not shown) for preamble detection and synchronization, RSSI and CINR detectors, Frame Control Header (FCH) and MAPS decoding, substantially as implemented in conventional customer premises (CPE) and Mobile Station (MS) devices, and a decoder enabling the femtocell to decode the sync-BTS signals. (The SoC operates both as a downlink receiver and an uplink receiver). Femtocell 14 further includes a clock oscillator 32, for example, a VCTCXO, coupled to SoC 30, which may be controlled by a v-tune clock adjustment signal.

Figure 3:
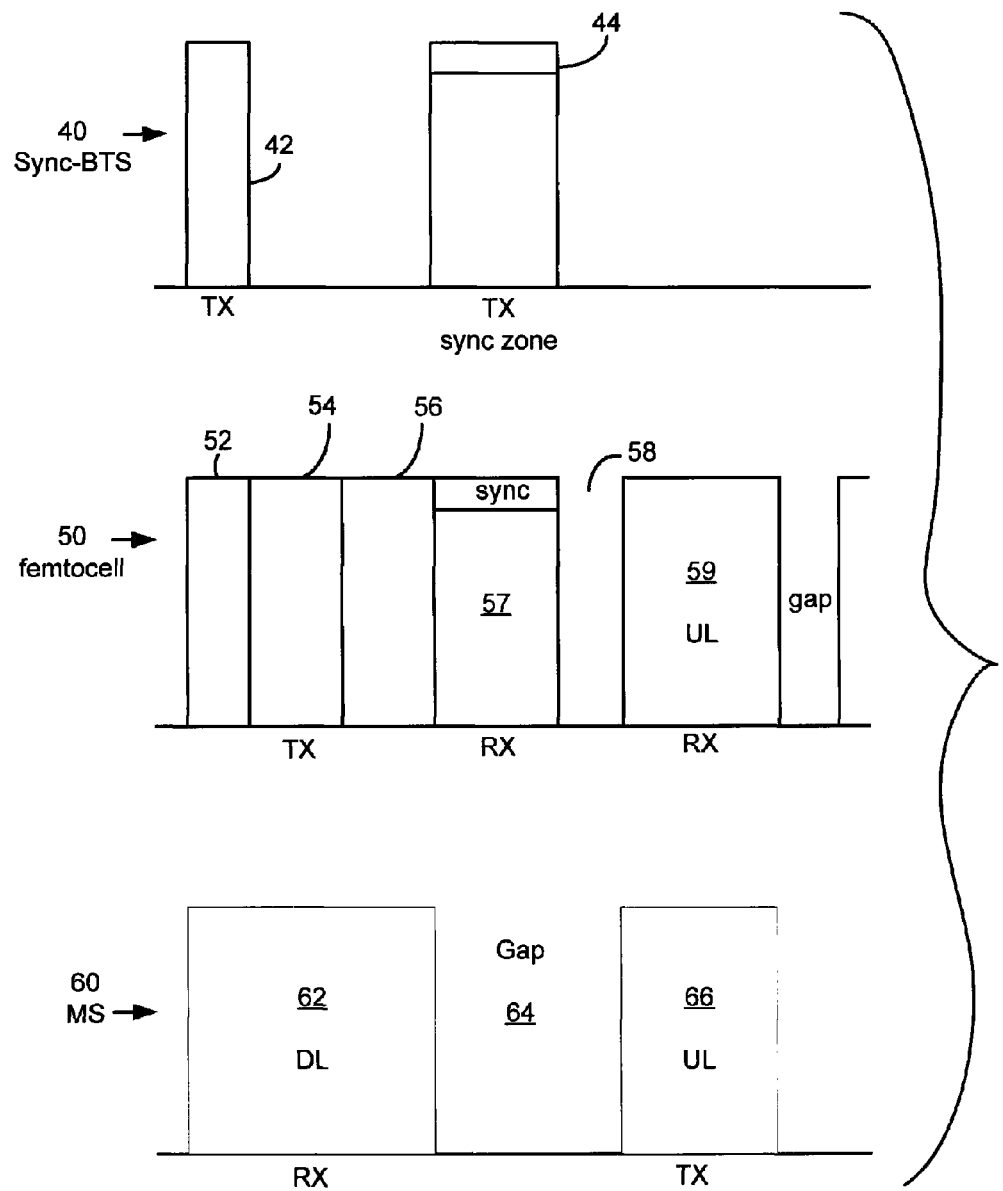
FIG. 3 is a schematic illustration of exemplary WiMAX transmission frames of a sync-BTS, a femtocell, and a mobile station, according to one embodiment of the present invention.

FIG. 3 is a schematic illustration of exemplary WiMAX transmission frames of a sync-BTS 40, a femtocell 50, and a mobile station 60, according to one embodiment of the present invention. The sync-BTS frame 40 includes transmission of the preamble 42 (which can be a standard WiMAX or LTE or other 4G technology preamble, or a proprietary preamble sequence, so as to distinguish from standard preambles), as well as transmission in a dedicated femtocell synchronization zone 44 for tracking purposes, as described below.

The femtocell frame 50 includes transmission of the femtocell preamble 52, MAPs 54 and data 56, followed by reception in the synchronization zone 57, a gap 58 and reception in the uplink sub-frame 59.

The mobile station frame 60 includes reception in the downlink (DL) sub-frame 62, a gap 64 for the transceiver to switch from reception to transmission, and transmission in the uplink (UL) sub-frame 66. During the mobile station gap 64, the femtocell switches from transmitting downlink data to receiving the sync signal from the sync-BTS, and decodes the sync signal, as described in detail below.

Operation of the network of the present invention will now be described with further reference to FIG. 2 and FIG. 3, which also illustrates schematically a method of over the air synchronization, according to one embodiment of the invention. As stated above, at the start of each frame, the sync-BTS transmits a preamble 42. The femtocells periodically perform preamble synchronization to the sync-BTS (i.e., instead of transmitting their own preamble 52, they receive the sync-BTS preamble) for initial acquisition. Thus, the femtocell acquires frequency estimation and timing estimation and starting point of frame from the sync-BTS, while locking frequency and starting point of the frame. While the highest quality synchronization can be obtained with preamble synchronization in each frame, the rate is configurable by the operator, and preamble synchronization can be performed once every 10 frames or at any other periodicity desired.

According to one embodiment of the invention, the sync-BTS can use beam forming techniques for transmitting the preamble and synchronization signals to achieve some spatial diversity, if applicable, and increase the link budget, such as constant beam forming or Cylic Delay Diversity, and other well known spatial technologies. During this time, in the downlink sub-frame 62, the mobile stations of the femtocell receive transmissions from the femtocell.

Figure 5:
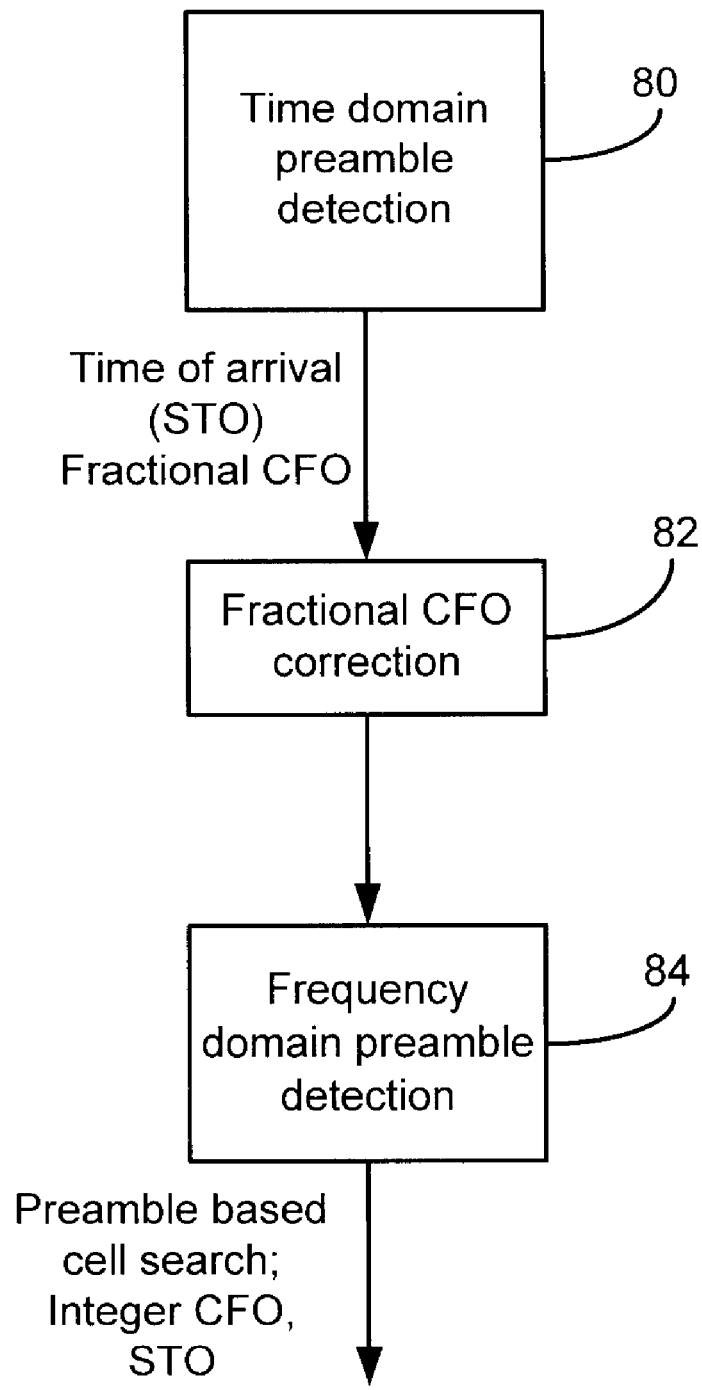
FIG. 5 is a flow chart illustrating a preamble detection process according to one embodiment of the invention.

According to one embodiment of the invention, which is one of the options for use in a WiMAX network, the preamble synchronization process utilizes the WiMAX downlink preamble, and implementation of the preamble detection is performed in three parts, as illustrated in a flow chart in FIG. 5:

1. The first part is Time Domain (TD) Preamble Detection (block 80), which estimates the preamble time of arrival based on the preamble's time domain characteristics. The fractional Carrier Frequency Offset (CFO) between the femtocells is also estimated. Its implementation may use dedicated hardware for autocorrelation, correlation power and peak detection.
2. The second part includes fractional CFO correction and symbol timing correction (block 82).
3. The third part is Frequency Domain (FD) Preamble Detection (block 84), which takes place after FFT processing, which performs a Cell Search, Integer CFO and AP Power estimation. Its implementation may use dedicated hardware (reuse of Initial Ranging hardware) and a software-based decision algorithm for choosing the best cell/segment.

Alternatively, any other method of preamble synchronization can be utilized.

After the initial acquisition of frequency, timing offset and starting point of the frame, the femtocell begins to transmit and receive as a base station, operating as an access base station for its mobile stations. According to preferred embodiments of the invention, the access operation is WiMAX® or LTE®.

Once it has been synchronized, the clock oscillator 32 sends out pulses coordinated with the sync-BTS. However, the internal clock tends to drift over time, so the femtocell must track the drift of its oscillator in frequency and timing, over time, so they can be corrected. This can be performed by tracking the shift in synchronization from the sync-BTS. In preferred embodiments of the invention, this is accomplished in one of two ways:

A repeat of the preamble detection process, described above, at given intervals (or when there is a loss of connection to an adjacent femtocell)

Allocating a slot in the sync zone (numeral 57 in FIG. 3) for clock time information, based on pilot tones transmitted by the sync-BTS, and causing the femtocell to track the pilot tones and correct the femtocell's internal clock.

According to the latter method, to achieve robust tracking, the sync-BTS transmits pilot tones on a dedicated zone 44 in the frame, for example, consisting of 2 symbols in PUSC (Partial Usage of Sub Channels) permutation for WiMAX based systems, on a single sub-channel—one slot—due to the sub-channelization employed, in order to achieve robust synchronization. Smart antenna techniques preferably are utilized, such as the transmit diversity Space Time Coding (STC) (or other beam forming technique) in the transmitter of the sync-BTS and implementing an MRC (Maximum Ratio Combining) technique in the femtocell receiver.

The femtocell receiver will decode the transmission as received in the femtocell synchronization zone, preferably on a frame-by-frame basis, and estimate the timing and frequency offset. It will use these estimations to correct its own frequency and adjust its RX/TX start time, accordingly. Thus, the synchronizing pilot signals of the sync-BTS are received by the femtocells and permit tracking of the frequency and timing estimation, to permit adjustment of the clock. Using these methods, the femtocell can achieve excellent sensitivity for the synchronization transmission, enabling very good coverage of a large geographical area by the sync-BTS for femtocell synchronization, even in indoor locations.

It will be appreciated that the transmission in the slot of the dedicated zone 44 can be filled with additional pilots (or repeating pilot tones) to add combining gain and further increase the receiver sensitivity.

It will further be appreciated that the description above relates to a WiMAX® network, by way of example only. However, the method can be adapted for use in LTE® and other 4G wireless communication technologies, as well.

According to a further embodiment of the invention, particularly in Time-Diversity Duplex (TDD)-type technologies, the synchronizing pilot signals can be transmitted during the femtocell gap. In this case, no separate synchronization zone is required. This is possible because, at the time the subscriber has a gap for its turnaround, the sync-BTS is transmitting its synchronization pilots and the femtocell is receiving (as seen in FIG. 3).

In Frequency-Diversity Duplex (FDD) systems, similar methods and apparatus can be employed. In FDD systems, the femtocells' transmission frequency differs from their reception frequency. The sync-BTS transmits in the receiver frequency of the femtocells, during an allocated time zone when the uplink of the femtocells transmission is muted.

According to an alternative embodiment of the invention, synchronization is provided together with an embedded management channel. In the allocated time zone of the sync-BTS (for example, the 2-symbol zone in WiMAX) and sub-channel slot, data can be transmitted, in addition to the pilot tones, enabling an over-the-air management channel. In this way, a centralized server can communicate with the sync-BTS and send management information/commands to all the femtocells in the area of the sync-BTS. In-band over-the-air (OTA) provisioning capabilities allow network operators to establish a fail-safe operational and life-line interface, even in the case of DSL or Cable modem failure, and to enable redundancy communication management to the femtocells.

In this case, communication between the femtocells can be provided by a point to point communication system. One point to point communication system providing high capacity backhaul between links, particularly suited for use in 4G mobile wireless communication networks, such as WiMAX, LTE, etc., is described in detail in applicant's co-pending US application publication number 2008/080364, entitled: Point-To-Point Communication Method. This system provides high capacity, high spectral efficiency backhaul transmissions between two nodes over a link in a micro- or pico-cell deployment. Preferably, each node includes a plurality of omni-directional antennas permitting up to 4 MIMO streams adaptively allocated to different antennas; and controlled beam pattern bandwidth for improving transmission quality and for interference mitigation. A number of other interference mitigation techniques for reducing interference over a link during backhaul are disclosed in applicant's co-pending US application publication number 2008/0049672, entitled: Point-To-Point Communication Method with Interference Mitigation.

The present invention is particularly suited to implementation in indoor locations, where the problem of synchronization of interior femtocells with outside femtocells is particularly difficult. In order to overcome problems of reception of GPS signals and obviate the need for a separate GPS receiver in each femtocell, it is sufficient for one indoor femtocell to receive the GPS signal, if the femtocells are coupled to one another, as via the point to point communication system described in the patent publications described above. In this way synchronization can be provided indoors. Alternatively, it is possible to synchronize all the femtocells inside the building by coupling one to an external base station which will act as a feeder node for the nodes deployed indoors, for purposes of synchronization and management signals.

It should be noted that clock synchronization and radio resource management can be enabled in the network described, while the data network can be deployed in a different network architecture, altogether. For example, synchronization and radio resource management can be provided from a macro base station where the network architecture is multi-hop, while data services are provided to the nodes via wired connection to a core network, i.e., DSL, Ethernet, optical fiber or in any other fashion.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A system for GPS (Geographical Positioning System) synchronization of a femtocell, as defined in the application, in a wireless telecommunications network, the system comprising:
   a dedicated Base Transceiver Station (a "sync-BTS") for transmitting synchronization signals;
   a GPS receiver coupled to said sync-BTS;
   at least one femtocell; and
   a processor in each said femtocell for performing time and frequency synchronization on said sync-BTS over an air interface;
   wherein said sync-BTS further includes a transmitter for transmitting pilot tones for tracking synchronization; and
   each said femtocell includes a decoder for decoding said pilot tones to correct timing and frequency offset in said femtocells.

2. The system according to claim 1, wherein said sync-BTS is integrated in a macro-base station.

3. The system according to claim 2, further comprising utilizing Space Time Coding (STC) in a transmitter of the sync-BTS and implementing an MRC (Maximum Ratio Combining) technique in said femtocell receiver.

4. The system according to claim 1, wherein said sync-BTS transmits on a same frequency as a collocated macro-base station.

5. The system according to claim 1, wherein said sync-BTS transmits on a different frequency from a collocated macro-base station.

6. The system according to claim 1, wherein a transmission frame of said sync-BTS includes a dedicated time zone and sub-channel slot for transmitting said pilot tones.

7. A system for GPS (Geographical Positioning System) synchronization of a femtocell, as defined in the application, in a wireless telecommunications network, the system comprising:
   a dedicated Base Transceiver Station (a "sync-BTS") for transmitting synchronization signals;
   a GPS receiver coupled to said sync-BTS;
   at least one femtocell;
   a processor in each said femtocell for performing time and frequency synchronization on said sync-BTS over an air interface;
   further comprising utilizing Space Time Coding (STC) in a transmitter of the sync-BTS and implementing an MRC (Maximum Ratio Combining) technique in said femtocell receiver.

8. A method for GPS synchronization of a femtocell, as defined in the application, in a wireless telecommunications network, the method comprising:
   coupling a module for GPS synchronization to a dedicated Base Transceiver Station (a "sync-BTS") arranged for transmitting synchronization signals;
   transmitting synchronization signals from said sync-BTS including transmitting a sync-BTS preamble;
   performing synchronization on said sync-BTS over an air interface by at least one femtocell, including performing preamble synchronization with said sync-BTS for initial acquisition; and
   wherein said preamble synchronization includes:
   Time Domain (TD) Preamble Detection, estimating a preamble time of arrival and a fractional Carrier Frequency Offset (CFO) between the femtocell and said sync-BTS;
   fractionally correcting CFO and correcting symbol timing; and
   Frequency Domain (FD) Preamble Detection, implemented after Fast Fourier Transform processing, performing a Cell Search, Integer CFO and AP Power estimation.

9. The method according to claim 8,
   wherein said step of transmitting further includes transmitting pilot tones;
   and further comprising tracking of frequency, timing and start of frame of said sync-BTS, by said femtocell, by means of said pilot tones.

10. The method according to claim 9, wherein said step of tracking includes:
    allocating a slot in a sync zone of a femtocell transmission frame for clock time information, based on said pilot tones transmitted by said sync-BTS; and
    causing said femtocell to track the pilot tones and correct the femtocell's internal clock.

11. The method according to claim 9, wherein said step of tracking includes repeating said preamble synchronization, at given intervals.

12. The method according to claim 8, wherein said step of transmitting includes transmitting over a femtocell network channel frequency.

13. The method according to claim 8, wherein said step of transmitting includes transmitting said pilot tones on a dedicated time zone and sub-channel slot in a transmission frame.

14. The method according to claim 13, further comprising encoding management channel signals in said sub-channel together with said pilot tones.

15. The method according to claim 14, further comprising:
    utilizing STC (Space Time Coding) when transmitting by said sync-BTS; and
    implementing a MRC (Maximum Ratio Combining) technique in said femtocell when receiving.

* * * * *